G. T. TRUNDLE, Jr.
MACHINE FOR MAKING SURGICAL COTTON POINTS AND THE LIKE.
APPLICATION FILED MAY 2, 1921.
1,438,623.
Patented Dec. 12, 1922.
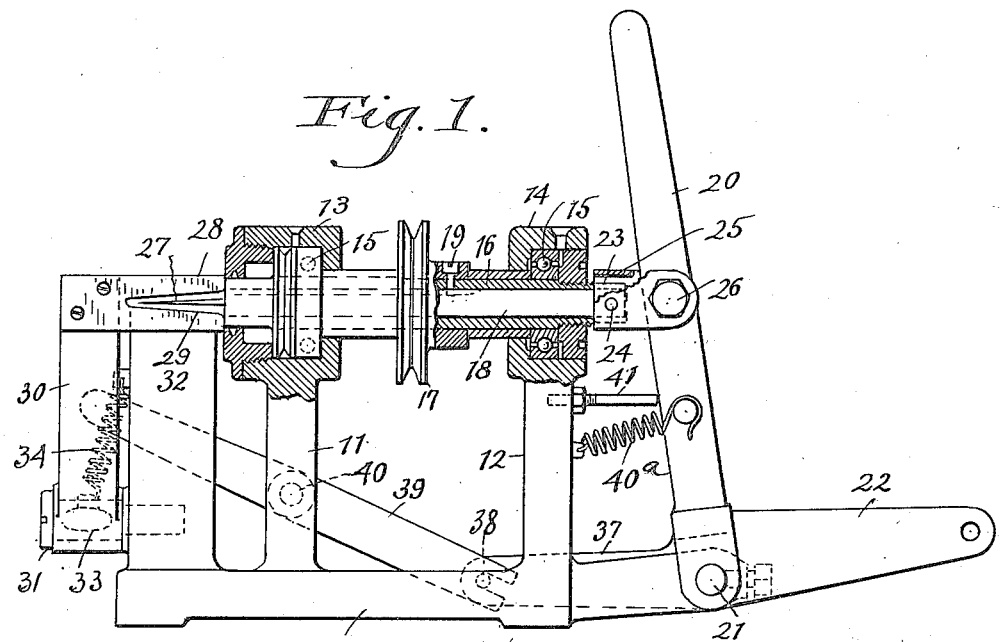
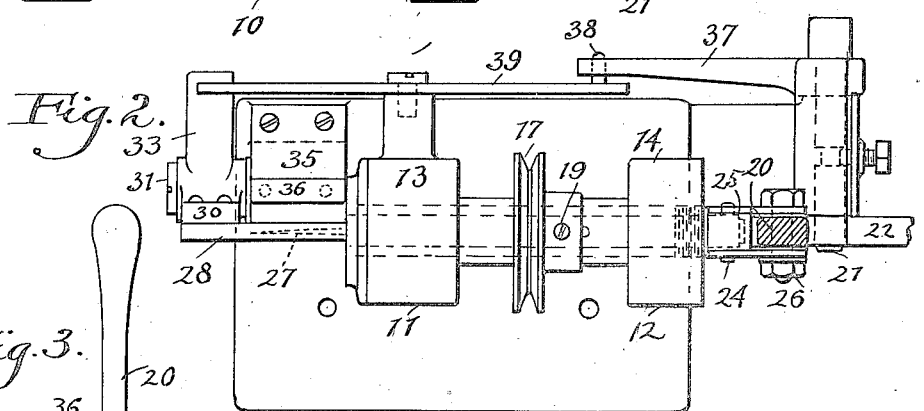
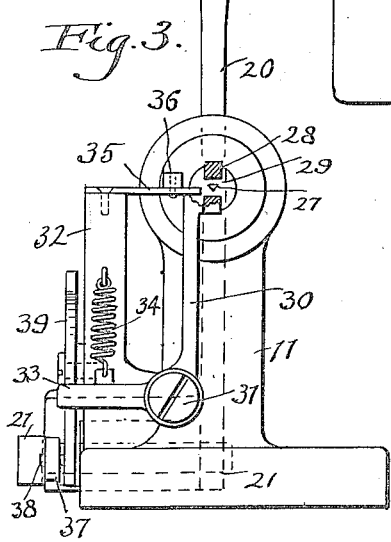
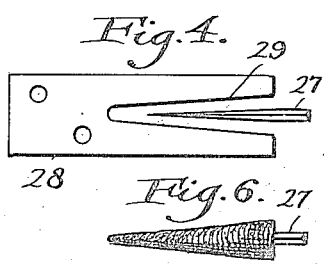
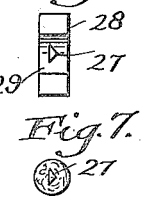
Inventor:
George T. Trundle Jr.
by
Thurston Kwis & Hudson
attys.

Patented Dec. 12, 1922.

1,438,623

UNITED STATES PATENT OFFICE.

GEORGE T. TRUNDLE, JR., OF CLEVELAND HEIGHTS, OHIO, ASSIGNOR TO EDITH W. STEPHAN, OF CLEVELAND HEIGHTS, OHIO.

MACHINE FOR MAKING SURGICAL-COTTON POINTS AND THE LIKE.

Application filed May 2, 1921. Serial No. 466,339.

*To all whom it may concern:*

Be it known that I, GEORGE T. TRUNDLE, Jr., a citizen of the United States, residing at Cleveland Heights, in the county of Cuyahoga and State of Ohio, have invented a certain new and useful Improvement in Machines for Making Surgical - Cotton Points and the like, of which the following is a full, clear, and exact description.

This invention relates to a machine for making surgical cotton points and the like, particularly of the type covered by Patent No. 1,210,720, granted January 2, 1917, to Edith W. Stephan.

The principal object of this invention is to provide a machine by which these cotton points and other articles of like nature can be produced rapidly, uniformly and effectively in the sense that the points or articles will be of the proper shape and will have the cotton forming them in compacted form, with the cotton fibres measurably interwoven so that the cotton point will have sufficient stiffness and retain its shape when being used.

The invention may be briefly summarized as consisting in certain novel details of construction, and combinations and arrangements of parts which will be described in the specification and set forth in the appended claims.

In the accompanying sheet of drawings, Fig. 1 is a side view of the machine with parts in section; Fig. 2 is a top plan view of the same; Fig. 3 is an end view looking toward the right of Figs. 1 and 2; Fig. 4 is a detached view of the former and needle or spindle on which the cotton is spun or wound; Fig. 5 is an end view of the same; Fig. 6 is a view of the needle or spindle with the cotton point formed thereon; and Fig. 7 is an end view of the same.

The subject matter of the Edith W. Stephan patent above referred to, is a projectile shaped surgical cotton point, adapted to be formed from cotton by applying loose cotton to a rapidly rotating spindle so that the cotton will be wound thereon, and by pressing the cotton toward the spindle, lengthwise thereof, so as to cause the fibres to intermesh and to be compacted, and also to cause the article to assume the desired elongated shape.

By the method as contemplated in the patent referred to above, the cotton points were made largely by hand, that is to say, the cotton was fed by hand to a rotating spindle, and at the same time shaped by the fingers of the hand, and finally pulled off the spindle, after which the large end of the cotton point would be cut off by scissors so that the point would have a finished appearance and be of the right length. While this method was satisfactory in certain respects, of necessity the process was more or less slow, and the number which could be produced in a given time by an operator was limited, causing the points to be expensive to produce.

The machine constituting the subject matter of this invention produces cotton points which in structure are much like those of the patent, but eliminates much of the hand labor, and greatly decreases the time required to produce the article.

This machine includes a horizontal base 10, having a pair of upstanding parallel arms 11 and 12, provided at the top with bosses 13 and 14. Rotatably supported on these bosses through the medium of annular ball bearings 15, is a hollow horizontal shaft 16, to which a high rotary speed is imparted by any suitable means, such as by a pulley 17 which can be driven by a belt from a suitable motor. Inside this hollow shaft 16 is a shaft 18 which rotates with the hollow shaft 16, but is movable axially thereof. In this instance, a set-screw 19 extends through the hollow shaft 16 into a key-way of the central shaft 18 so as to permit the inner or central shaft to be moved in an endwise direction, but constrains the two shafts to rotate in unison.

The inner shaft 18 is adapted to be moved in an endwise direction while being rotated at high speed with the shaft 16, by a hand lever 20 pivoted at 21 on the extension of the boss 10. This lever has at the bottom an extension 22, to which a connection can be made from a foot pedal so that endwise motion can be imparted by the foot of the operator, if desired. The connection between the non-rotating lever 20 and the rotating shaft 18 is made through the medium of a sleeve 23, which is swiveled onto the rear end of the shaft 18, and which has at oppositely disposed points, through the medium of pins 24, a connection with a member 25 which is the equivalent of a link connected by a pin or bolt 26 to the lever 20.

Adapted to be inserted and fixed in the forward end of the central shaft 18, i. e., to the end opposite to that just considered, is a needle or spindle 27, preferably a three sided spindle, as illustrated in Figs. 4 to 7. It is upon this spindle, which is tapered to a point, as clearly shown in Figs. 1 and 4, that the cotton point is formed. The purpose of giving the needle or spindle the three sided shape is to cause the cotton to be firmly compacted thereon, especially the cotton which is initially applied.

Co-operating with the spindle 27 is a former 28 in the form of a flat strip having a tapered slot 29 extending inward from one end, this end lying close up against the forward end of the hollow rotating shaft 16, as shown in Figs. 1 and 2. The shape of the slot 29 in outline and length conforms to the shape of the cotton point to be formed, the taper spindle 27 extending centrally through this slot from the large end to substantially the small end thereof during the forming operation which will be referred to presently. The former 28 is adapted to be moved from its normal position, and to that end it is secured to a casting having an upstanding arm 30, pivoted at its lower end by a screw 31 to an arm 32, preferably cast integral with the base and extending upwardly therefrom just in front of the forward shaft supporting arm 11, slightly to one side of the center plan of the machine. The casting, of which the former-supporting arm 30 is a part, has at the bottom a lateral extension 33, and to this is attached a coil spring 34, the function of which is to hold the former in operative position and to restore it to that position after the former has been moved laterally by being swung about the axis of the pivoting screw 31. Horizontally disposed opposite the slot 29 of the former there is a stationary ejector 35, so disposed that when the spindle on which the cotton point has been formed is retracted into the hollow rotating shaft 16 by the endwise movement of the shaft 18, and when the former is swung to the left, as viewed in Fig. 3, until it engages a stop 36 (see particularly Fig. 3) the ejector will eject the cotton point from the slot 29.

For the purpose of swinging the former over toward the ejector in the manner just stated, after the spindle has been withdrawn from the cotton point which has been formed on the spindle in the slot of the former, the hand lever 20 is provided with an inwardly extending arm 37 (see Fig. 2) and the free end of this arm has a pin and slot connection at 38 with a lever 39 pivoted midway between its ends at 40 on the base of the machine, the extreme forward end of this lever 39 being above the lateral extension 33 of the former-supporting arm 30, as shown in Figs. 2 and 3.

The construction and arrangement are such that the hand lever 20 is normally held by a coil spring 40 against a stop 41 carried by the rear arm 12, and when the hand lever is in this position the spindle 27 projects the proper distance into the tapered slot or notch of the former, the forward end of the lever 39 then being some distance above the extension 33 of the former-supporting arm. If, however, the hand lever 20 is retracted, the shaft 18 is slid in an endwise direction through the hollow shaft 16, pulling the entire projecting portion of the needle or spindle 27 into the hollow shaft, and just as the spindle disappears into the shaft 16, the forward end of lever 39 strikes the extension 33 of the former-supporting arm and rocks the former 28 toward the adjacent end of the ejector 35.

The machine is operated in the following manner: The two shafts 16 and 18 are rotated at a high speed with the parts in the position shown in Fig. 1; then loose cotton is fed onto the rotating spindle 27 until a tight or compacted cotton point is formed on the spindle, the desired tapered shape of the cotton point being imparted to the latter by the former 28, it being understood that the entire space formed by the notch 29 is filled by the cotton point, i. e., the cotton point extending from the forward end of the hollow rotating shaft 16 to the end of the narrow part of the forming slot or notch 29.

As soon as the cotton point has thus been formed, the operator swings the lever 20, withdrawing the spindle from the formed cotton point and causing the former to be swung laterally so that the ejector will push the cotton point from the former. This produces a finished cotton point of the right size and firmness, and without the necessity for trimming the end of the cotton point. The operation is then repeated for the next cotton point. The forming of the cotton point and its ejection from the former consume very little time, the result being that the points can be formed so rapidly that the cost of production is low.

I might add that it is an important feature of the invention that the large end of the cotton point as it is being formed and as the needle or spindle is being retracted from it bear against the rotating hollow shaft 16, for should the end of the cotton bear against a stationary part while the spindle is being retracted, the end of the point would be damaged, and a trimming operation would be necessary.

While I have shown the preferred construction only, I do not desire to be confined to the precise details shown, as changes may be made without departing from the spirit and scope of the invention. For example, while I have here shown the former swung laterally to a stationary ejector, the reverse arrangement might be employed wherein the former would be held stationary and the ejector moved relatively to it. Furthermore, the machine can be employed for forming articles of shapes other than the projectile shape herein described, it being only necessary to give the slot of the former a shape corresponding to the desired shape of the article. Other minor changes of like character may be made in the machine.

Having described my invention, I claim:

1. In a machine of the character described, a pair of rotary members, one having a spindle adapted to have fibrous material wound thereon, means for rotating both of said members in the same direction, and means for moving one of said members relative to the other in a direction longitudinal of the spindle so as to push the formed article from the spindle.

2. In a machine of the character described, a pair of rotary members, one located inside the other, the inner member having a spindle on which fibrous material is adapted to be wound, means for rotating both said members in the same direction, and means for moving one of said members relative to the other to push the formed article from the spindle.

3. In a machine of the character described, a pair of rotary members, one located inside of the other and mounted for endwise movement, a spindle carried by the inner member and adapted to have fibrous material wound thereon, means for rotating both said members in the same direction and means for moving said inner member and spindle in an endwise direction in the outer member.

4. In a machine of the character described, an outer rotating shaft, an inner shaft within said outer shaft and provided with a spindle normally projecting from the outer shaft and on which fibrous material is adapted to be wound, means for rotating the outer shaft, means by which the inner shaft is rotated by the outer shaft at the same speed and in the same direction as the latter, and means for moving the inner shaft in an endwise direction through the outer shaft so as to move the spindle into the outer shaft and withdraw the spindle from the article formed thereon.

5. In a machine of the character described, a pair of rotary shafts, one within the other, the inner shaft having a spindle on which cotton is adapted to be wound to form an article of predetermined shape, a former having a slot corresponding to the shape of the article to be formed, the needle normally projecting into said slot, means for rotating both said shafts in the same direction, and means for moving one of said shafts relative to the other in an endwise direction.

6. In a machine of the character described, a pair of rotary shafts, one within the other and both rotatable in the same direction, the inner shaft being movable in an endwise direction and carrying a spindle normally projecting beyond the end of the outer shaft, a former serving to impart a predetermined shape to the article formed on the spindle, and means for moving the inner shaft in an endwise direction for withdrawing the spindle from the article formed on it.

7. In a machine of the character described, a rotatable spindle on which fibrous material is adapted to be wound, a former having a recess into the open end of which the spindle normally projects and serving to shape the article which is being formed on the spindle, and means for causing the withdrawal of the spindle from the article and the ejection of the article from the former after the spindle is withdrawn.

8. In a machine of the character described, a rotary spindle on which fibrous material is adapted to be wound, a former having an opening in which the spindle normally projects and serving to shape the article being formed on the spindle, and means for causing the withdrawal of the spindle from the article and the ejection of the article from the former in a lateral direction.

9. In a machine of the character described, a rotary spindle on which fibrous material is adapted to be wound, a normally stationary former having an opening in which the spindle normally projects and serving to shape the article formed on the spindle, and means for causing the spindle to be withdrawn from the article formed thereon and for moving the former to cause the article to be ejected therefrom.

10. In a machine of the character described, a rotary shaft having a spindle on which fibrous material is adapted to be wound, a former adjacent the spindle and serving to shape the article, means for shifting said shaft in an endwise direction to cause the spindle to be withdrawn from the article, and means operated by the first named means for causing the ejection of the article from the former.

In testimony whereof, I hereunto affix my signature.

GEO. T. TRUNDLE, Jr.